Figures 1, 2:
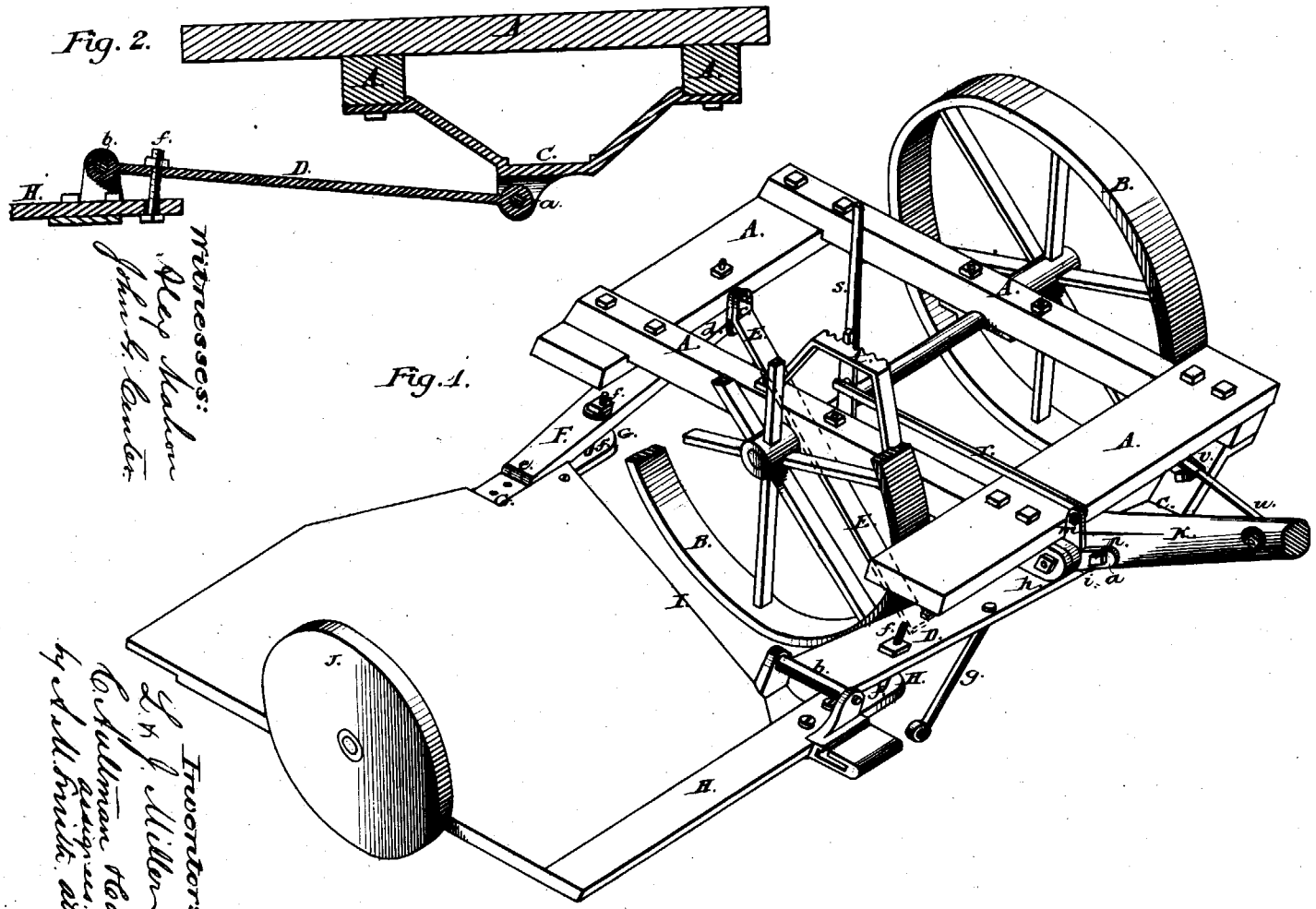

L. & J. MILLER.

Harvester.

No. 6,485.

Reissued June 15, 1875.

Witnesses:
Alex Mahon
John G. Center

Inventors:
L. & J. Miller
C. Aultman & Co.
assignees.
by A. M. Smith, atty.

THE GRAPHIC CO. PHOTO-LITH. 39 & 44 PARK PLACE, N.Y.

UNITED STATES PATENT OFFICE.

LEWIS MILLER AND JACOB MILLER, OF CANTON, OHIO, ASSIGNORS TO C. AULTMAN & CO.

IMPROVEMENT IN HARVESTERS.

Specification forming part of Letters Patent No. 24,700 dated July 5, 1859; reissue No. 6,485, dated June 15, 1875; application filed May 19, 1875.

*To all whom it may concern:*

Be it known that we, LEWIS MILLER and JACOB MILLER, of Canton, in the county of Stark and State of Ohio, have invented a new and useful Improvement in Harvesting-Machines, of which the following is a full, clear, and exact description, reference being had to the accompanying drawings, making part of this specification, and in which—

Figure 1 represents in perspective a portion of a harvesting-machine, sufficient to illustrate the character of our invention, and Fig. 2 represents a vertical section taken through the finger-bar and main frame in line with it, as also through the hinged bar by which they are connected.

Similar letters of reference, where they occur, denote like parts of the machine in both figures.

The invention relates to harvesting-machines having a main frame, and two main or driving-wheels, and a finger-beam or platform hinged to the main frame; and consists in suspending the finger-beam or platform to the main frame by means of an intermediate piece or arm, that at one end is flexibly connected with the main frame, and at the other end is attached to the finger-beam or platform by a connection which is flexible in an upward direction and rigid in the direction of the ground.

Before the discovery by applicants of their said improvement, the usual method of attaching the finger-beam of a two-wheeled harvesting-machine to the main frame was by means of an intermediate coupling-arm hinged to the frame at one end, and to the finger-beam or platform at the other, and in addition, the coupling-arm, with the finger-beam or platform so attached, was suspended from the main frame by a chain. The leading objections to this method of attachment and suspension were these: First, the entire weight of the inner end of the finger-beam, platform, and raking and cutting apparatus, rested on that side of the frame, and, by consequence, on the wheel on that side, at which the chain was attached; second, the uniform and regular operation of the cutting apparatus was seriously interfered with by the motions communicated to it by the main frame in passing over uneven ground.

If the wheel nearest the finger-beam followed or suddenly dropped into a depression in the ground, and the opposite wheel did not, the effect was to make the sickles or knives cut closer to the ground at the heel or inner end of the beam than at the outer end, and if the depression was of considerable depth there was even a liability of the finger-beam and cutting apparatus being forced into the ground at such heel end. On the other hand, in passing over an elevation in the ground, or an obstacle in the track of the wheel nearest the beam, the result was (unless the outer wheel was also affected by the elevation or obstacle) that the cutting apparatus was raised at the end nearest the frame, and the grain was cut much farther from the ground than at the outer end of the beam.

To enable others to more clearly understand the invention, we will describe, with reference to the drawings, how the same can be carried out in practice.

In the accompanying drawings, A represents the main frame, supported upon the carrying and driving wheels B. Underneath the front part of the main frame is a bracket or hanger, C, to which one end of the brace or bar D is hinged, as at *a*, the other end of said brace or bar being hinged at *b* to the platform or finger-beam, or to a plate that is attached to or unites them. The bar D is strengthened by a brace, E, that is rigidly bolted to said bar D, and, extending back, is pivoted to the rear of the machine, as at *c*, so that it will allow said bar to freely work on its hinged point *a*. The rear of the platform may be similarly hinged to the main frame by a bar, F, said bar being hinged at *d* to the main frame, and at *e* to the platform or platform-bar G. H may represent the finger-beam, or it may be a separate beam, to which the platform is united, or on which it is supported. This beam or bar H, as well as the one G, projects beyond the inside edge I of the platform far enough to receive a suspension-bolt, *f*, (one in each,) which bolts suspend said bars from the hinged bars D F, and prevent the outer end of the platform from rising on the hinge *b*, but allowing the inner edge of the platform to rise or yield upward to a given extent, (which may be regulated by the adjustment of the suspension-bolts,) but which prevent said inner edge of the platform from dropping below a given line, and thus, while the main frame and the platform may freely move on the hinged or pivoted point *a d*, there is provision for a rising motion along the inner line of the platform, which can take place without in any wise affecting or being affected by the rising of the outer part of the platform, or of the main frame. Thus, if the inside shoe or divider should pass over any obstacle, the platform and braces will admit of rising to yield to such obstacles without affecting the main frame or outer portion of said platform, while in any upward movement of the outer edge of the platform the center of vibration of said platform is transferred from the joint *b* to the points of connection between the platform and the main frame, which, in the present instance, are at *a d*, within or between the vertical longitudinal planes in which the driving-wheels move. When the heel extension or arm at the inner end of the finger-beam is thus suspended, it will be seen that the inner end is supported and carried by the main frame, and the outer end by a grain-wheel, J, said ends rising and falling with the rising and falling of said frame and grain-wheel respectively. The wheel J is made adjustable for setting the outer end of the platform higher or lower, as desired. When the machine is to be used as a mower, the platform and outer wheel are removed. The rear hinged arm F may also be removed, as it is not used when the machine is converted into a mower. *g* is a brace designed for bracing the inside shoe or divider. The tongue K is pivoted at its heel to the frame *h*, being the pivoting-bolt. *i* is a T-shaped lever, one arm of which is bolted to the tongue at *n*. Another arm receives the bolt *h* through it, and to the third arm *m* is attached a connecting-rod *r*, which, extending rearward, is attached to a lever, *s*, by which the main frame can be raised or lowered, and held when at the proper height by a tooth or projection on said lever, taking into one of the notches in the catch-piece *t*. The tongue is braced by a brace, *u*, fastened to it and pivoted at *v* to the main frame.

Having thus fully described the nature and object of the invention, what is claimed as new, and sought to be secured by Letters Patent, is—

1. In a two-wheeled harvesting-machine, having a double-hinged connection, an extension of the finger or platform-bar or arm to a point of suspension outside of the inner hinge, for the purpose of carrying the point of vibration of said bar between the two wheels.

2. In a two-wheeled harvesting-machine, having a finger-beam, with a double-hinged connection to the main frame, a suspending device for controlling the action of the hinge nearest the finger-beam, whereby said hinge is made flexible in an upward direction, and is prevented from being flexed in the direction of the ground.

LEWIS MILLER.
JACOB MILLER.

Witnesses:
DANL. TONNER,
H. E. TOGLE.